United States Patent

Volz

[19]

[11] Patent Number: 5,839,349

[45] Date of Patent: Nov. 24, 1998

[54] NOISE-ABATED PUMP UNIT, IN PARTICULAR FOR CONTROLLED BRAKE SYSTEMS

[75] Inventor: Peter Volz, Wingerten, Germany

[73] Assignee: ITT Automotive Europe GmbH, Germany

[21] Appl. No.: 454,212

[22] PCT Filed: Dec. 8, 1993

[86] PCT No.: PCT/EP93/03455

§ 371 Date: Jul. 19, 1995

§ 102(e) Date: Jul. 19, 1995

[87] PCT Pub. No.: WO94/13518

PCT Pub. Date: Jun. 23, 1994

[30] Foreign Application Priority Data

Dec. 11, 1992 [DE] Germany .......................... 42 41 827.5

[51] Int. Cl.$^6$ .................................................. F01B 1/00
[52] U.S. Cl. .................. 92/147; 92/129; 92/84; 92/148; 384/536; 417/273; 417/313; 417/410.1
[58] Field of Search ............... 91/475, 491; 417/313, 417/273, 410.1; 92/84, 129, 137, 147, 148; 384/536, 448

[56] References Cited

U.S. PATENT DOCUMENTS

| | | | |
|---|---|---|---|
| 2,015,784 | 10/1935 | Brown | 384/586 |
| 3,672,734 | 6/1972 | Bando | 384/536 |
| 3,910,164 | 10/1975 | Swadner et al. | 417/273 X |
| 4,363,607 | 12/1982 | Eichele et al. | 417/313 X |
| 4,568,131 | 2/1986 | Blomberg et al. | |
| 4,619,588 | 10/1986 | Moore, III | 417/410.1 X |
| 4,626,178 | 12/1986 | Terumoto | 417/410.1 X |
| 4,746,231 | 5/1988 | Hoshino | 384/536 X |
| 4,854,751 | 8/1989 | Grassmuck et al. | 384/536 X |
| 5,039,283 | 8/1991 | Mergenthaler et al. | 417/273 |
| 5,044,785 | 9/1991 | Bair et al. | 384/536 |
| 5,100,305 | 3/1992 | Zirps | 417/273 X |
| 5,207,771 | 5/1993 | Sugisaw et al. | 417/273 X |
| 5,213,482 | 5/1993 | Reinhartz et al. | 417/273 |
| 5,375,982 | 12/1994 | Joosse et al. | 417/273 |

FOREIGN PATENT DOCUMENTS

| | | | |
|---|---|---|---|
| 654189 | 11/1992 | Australia | 417/273 |
| 0197320 | 3/1986 | European Pat. Off. . | |
| 0220581 | 5/1987 | European Pat. Off. . | |
| 0204235 | 6/1987 | European Pat. Off. . | |
| 2641509 | 7/1990 | France . | |
| 1037572 | 8/1958 | Germany . | |
| 7040270 | 5/1971 | Germany . | |
| 1613396 | 12/1971 | Germany . | |
| 2025621 | 12/1971 | Germany . | |
| 1538923 | 10/1972 | Germany . | |
| 7310487 | 7/1973 | Germany . | |
| 2810121 | 9/1979 | Germany . | |
| 2933437 | 3/1981 | Germany . | |
| 3133111 | 4/1983 | Germany . | |
| 3707600 | 9/1988 | Germany . | |
| 3722988 | 1/1989 | Germany . | |
| 3743574 | 7/1989 | Germany . | |
| 3808901 | 10/1989 | Germany . | |
| 3840691 | 6/1990 | Germany . | |
| 3900327 | 7/1990 | Germany . | |
| 3941442 | 7/1990 | Germany . | |
| 4012507 | 10/1991 | Germany . | |
| 3939184 | 11/1991 | Germany . | |
| 4110971 | 10/1992 | Germany . | |
| 317649 | 11/1956 | Switzerland . | |
| 1390520 | 4/1975 | United Kingdom | 417/273 |
| WO8303640 | 10/1983 | WIPO . | |

OTHER PUBLICATIONS

Pp. 819–823 of German Technical Publication Entitled Othydraulik und Pneumatik. 34(1990) Nr. 12.

German Patent Application Entitled"Schallgedampftes Lager"; Inventor I. Kruger. Aug. 17, 1967.

Primary Examiner—F. Daniel Lopez
Attorney, Agent, or Firm—J. Gordon Lewis; Thomas N. Twomey

[57] ABSTRACT

A reduced noise radial piston pump with a driving motor for a controlled brake system. The noise reduction is primarily accomplished by locating and orienting the motor/pump bearings with respect to the pump pistons.

2 Claims, 1 Drawing Sheet

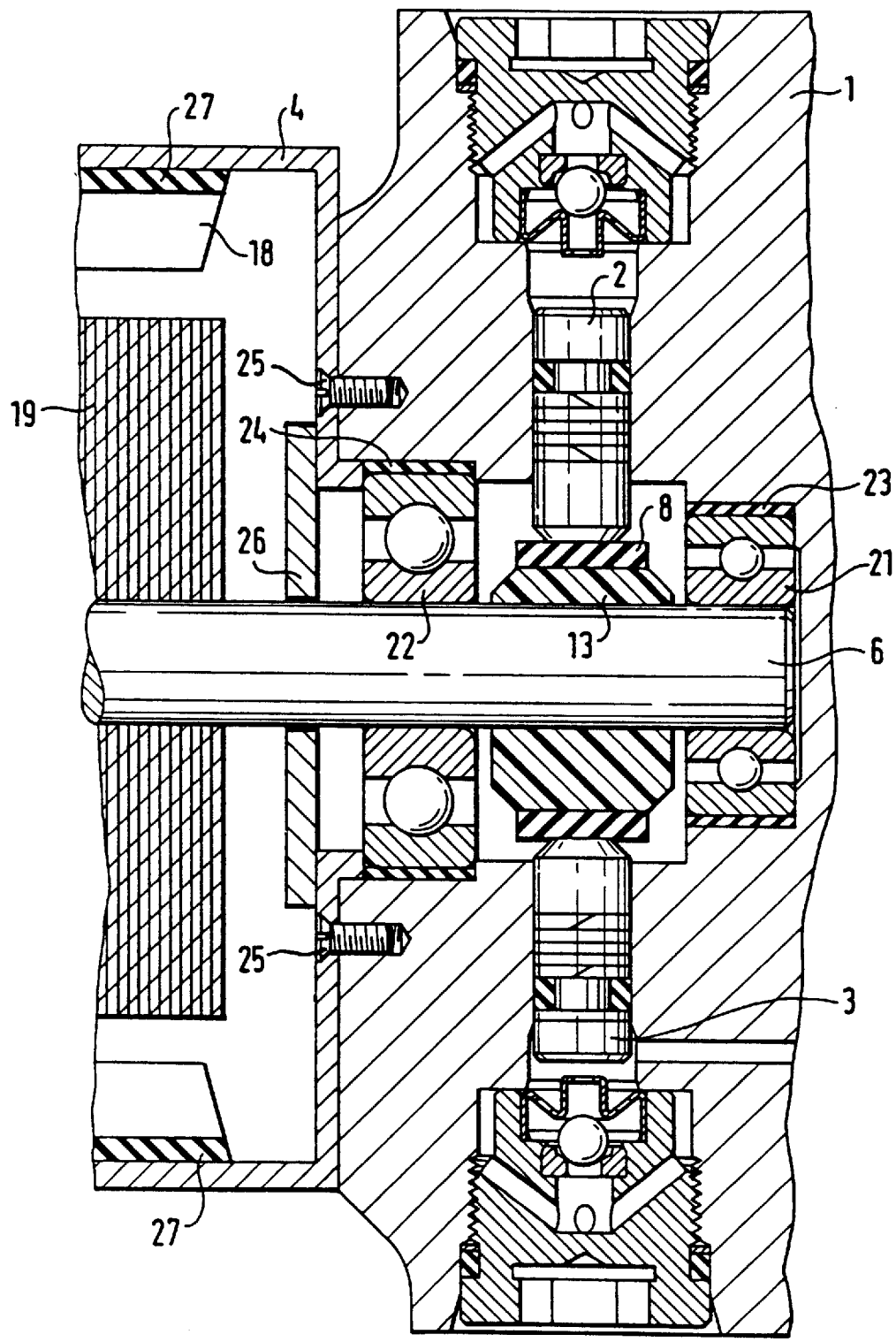

NOISE-ABATED PUMP UNIT, IN PARTICULAR FOR CONTROLLED BRAKE SYSTEMS

TECHNICAL FIELD

This invention relates to pumps, and more particularly relates to radial piston pumps, in particular of a high-pressure piston pump, and of a driving motor.

BACKGROUND OF THE INVENTION

Radial piston pumps are inter alia used in controlled brake systems of automotive vehicles, e.g., in order to prevent the wheels from locking (ABS) or spinning (anti-lock) during the process of braking or starting. Pumps used in ABS and anti-lock systems tend to be noisy, and the noise therefrom is particularly noticeable because these systems are activated relatively infrequently and their accompanying noises are often misinterpreted by the driver.

Referring to anti-lock-controlled and traction-slip-controlled brake systems, this is particularly true of the electric-motor-driven high-pressure pumps used with these systems where the noises of the high-pressure pump can make themselves noticed in a rather disagreeable manner.

There have been suggestions to provide the pump housing with an insulating coating or to encapsulate it in some other way so as to make it noiseproof. However, the cost of doing so along with the space needed by such a pump are considerable.

From DE-OS No. 38 08 901 it is further known to provide special silencing chambers for abating the pump noises. A further description of such radial piston pumps becomes evident from DE-OS No. 37 22 988.

SUMMARY OF THE INVENTION

It is an object of this invention to provide measures for the driving motor and the piston pump which will result in a noise abatement of the drive-and-pump unit.

This invention includes supporting at least one point of the shaft of the driving motor in the pump housing itself, with the bearing being arranged as near as possible to the range of impact of the drive shaft on the pump pistons. Due to the silencing action of the bearing this arrangement will reduce the transmission travel of the sound waves emanating from the range of impact of the shaft on the pump piston, at the same time the strain of the shaft over its length being reduced since the bearing and, thus, the pump housing absorb the forces of the pump pistons in the immediate vicinity of their range of impact.

A particularly simple embodiment introducing the shaft end of the driving motor into the bearing of the pump housing.

The absorption of the piston forces in the pump housing will be particularly efficient if antifriction bearings are used.

In a preferred embodiment the drive shaft is supported exclusively in the pump housing. This means that there is no bearing for the drive shaft in the housing of the driving motor so that there are no vibration-transmitting points of contact between the drive shaft and this housing. Such an arrangement is also referred to as free floating in the motor housing.

In developing this invention further, the outer bearing bush of at least one bearing is supported on the pump housing by way of a silencing layer in order to increase even further the pump noise silencing achieved by the absorption of the piston forces in the pump housing. In accordance therewith the forces taken up by the shaft are transmitted via the bearings in the pump housing and thence to the pump housing via a silencing layer. On the one hand, this silencing layer serves to reduce the force gradient, i.e., the change of the force active in the bearings per time unit, in that the bearings are elastically held in the pump housing. At the same time, however, the silencing layer also provides a stop to the sound transmission from the bearings into the pump housing.

A suitable way of fastening the silencing layer is by gluing or vulcanizing. In order to reduce the sound transmission from the shaft into the housing of the driving motor it is possible to support the shaft in the drive housing by means of but one sole bearing. It is possible to use the silencing layer described further above with this bearing of the driving motor.

An even increased abatement of the sound transmission from the pump into the motor housing is achievable by supporting the bearing plate in an orientation relative to the axis of the drive shaft. Thereby, all of the bearing forces are absorbed by the pump housing itself. The bearing plate for holding the drive shaft essentially only serves purposes of transport so that during operation no bearing is provided in the motor housing for the absorption of the forces exerted on the shaft.

BRIEF DESCRIPTION OF THE DRAWING

In the following, one example of an embodiment of this invention will be explained, reference being made to the drawing. In doing so, the individual assembly units will be explained only in so far as they are of essential importance for this invention. A detailed description of the fundamental mode of operation of the represented pump can be found in DE-OS No. 40 27 848.

Two pistons 2, 3 are guided in a pump housing 1 so as to be radially movable. A drive shaft 6 is projecting between the pistons. Fixed on this drive shaft 6 is an eccentric part 13 which revolves with the drive shaft 6. A bearing ring 8 is arranged between the eccentric part 13 and the pistons 2, 3, the bottom of the pistons 2, 3 resting on the bearing ring 8. Instead of the sliding bearing represented in this example it is also possible to provide an antifriction bearing lying between the eccentric part 13 and the piston 2 and 3.

The eccentric part 13 consists of an elastomeric material for silencing the sound waves which are moving from the drive shaft 6 in the directions of the pistons 2, 3. Besides, the isomeric, elastic material of the eccentric part 13 procures a certain compensation of the pulsating forces ensuing on the shaft. The here prevailing conditions have already been explained in detail in Patent Application DE No. 42 41 825.

The shaft 6 is provided with a separate eccentric part 13 which is connected with the shaft 6 by means of an adhesive type of connection such as gluing, welding or vulcanization. The eccentric part 13 consists of an elastomeric silencing material such as plastic or rubber and is surrounded by a bearing ring 8 whereon the pistons 2, 3 are seated. In this example of an embodiment, the pistons 2, 3 slide on the bearing ring 8 while the shaft 6 of the driving motor is revolving. However, instead of the sliding bearing it is also possible to use antifriction bearings, in particular needle roller bearings. Within the scope of this invention it is also possible for the eccentric part which is an all-elastomeric material component to be formed by annular layers instead, with iron or steel layers alternating with plastic ones. This will produce one or several noise stops and, simultaneously, an increase in the strength of the eccentric part 13.

The shaft 6 projects into the pump housing 1, proceeding from the housing 4 of the driving motor where the shaft 6 is driven by way of magnets 18 and an armature 19. The drive shaft 6 is supported in the pump housing 1 by way of an internal antifriction bearing 21 and an external antifriction bearing 22. However, it is also possible to use suitable sliding bearings in each case, either alone or jointly, instead of the antifriction bearings 21, 22. Of particular importance for this invention are annular silencing layers 23 and 24, respectively, which in each case are arranged between the outer surface of the outer bearing bush of the bearings 21 and 22, respectively, and the corresponding bores of the housing 1 which accommodate the bearings 21, 22.

The motor housing 4 is screwed fast with the pump housing by way of outlined screws 25. Further, a bearing plate 26 is fastened on the front side of the motor housing 4. Up to a certain extent, this bearing plate 26 is able to absorb forces acting on the drive shaft 6. The bearing plate 26 is designed with play relative to the drive shaft 6 and serves to support the drive shaft 6 as long as the housing 4 of the driving motor has not yet been mounted on the pump housing 1. After assembly, there will be a centering of the drive shaft 6 with regard to the bearing plate 26 so that there is no contact between the same and the drive shaft 6.

Thus, the bearing plate 26 for holding the drive shaft 6 essentially serves purposes of transport so that in operation no bearing is provided in the motor housing for the absorption of the forces exerted on the shaft 6.

Of further substantial importance for this invention is the silencing layer 27 to which the magnets 18 of the driving motor are fastened to the housing 4 of the motor. Again, this preferably annular silencing layer 27 also serves to bar any solid-borne sound waves and to abate the forces exerted on the magnets 18 via the armature 19.

The fastening between the housing 4 of the driving motor and the pump housing 1 can also happen with the interposal of an intermediate silencing layer.

Thus, this invention relates to a radial piston pump with a driving motor for a controlled brake system. It is the object of this invention to abate the noises produced by a high-pressure pump of the system. The solution essentially consists in that the drive shaft of the electric motor which belongs to this system is supported in the pump housing (only) and in that the bearings (21, 22) are arranged as near as possible to the range where the pistons (2, 3) of the pump (1) act on the shaft (6).

I claim:

1. A pump system of the type including a driving motor and a driven radial piston pump, where at least one piston is moved so as to reciprocate in a piston bore by means of a drive shaft of the driving motor, which drive shaft is provided with an eccentric part, with the housing of the pump being connected with the housing of the driving motor by means of a detachable type of connection, comprising: at least one bearing being provided for the drive shaft of the driving motor, wherein said bearing is supported in the pump housing adjacent to the range of movement of the piston on the drive shaft and the drive shaft is supported in a bearing plate which is fastened to the housing driving motor so as to be perpendicular to the axis of the drive shaft.

2. A pump system of the type including a driving motor and a driven radial piston pump, where at least one piston is moved so as to reciprocate in a piston bore by means of a drive shaft of the driving motor, which drive shaft is provided with an eccentric part, with the housing of the pump being connected with the housing of the driving motor, comprising: at least one bearing being provided for the drive shaft of the driving motor, wherein said bearing is supported in the pump housing adjacent to the range of movement of the piston on the drive shaft and the drive shaft is supported in a bearing plate which is fastened to the housing driving motor so as to be perpendicular to the axis of the drive shaft.

* * * * *